United States Patent [19]

Ferri

[11] Patent Number: 5,104,203
[45] Date of Patent: Apr. 14, 1992

[54] ARRANGEMENT FOR EMULATING A J-TYPE RELAY AIR VALVE USEABLE IN A RAILWAY BRAKING SYSTEM

[75] Inventor: Vincent Ferri, Pittsburgh, Pa.

[73] Assignee: Westinghouse Air Brake Company, Wilmerding, Pa.

[21] Appl. No.: 645,363

[22] Filed: Jan. 24, 1991

[51] Int. Cl.⁵ .................. B60T 15/14; B60T 13/68
[52] U.S. Cl. ........................... 303/15; 303/20; 303/16; 303/18; 303/101
[58] Field of Search .............. 303/15, 3, 14, 13, 18, 303/19, 16–17, 25–27, 20, 101, 100, 2, 76, 86, 68, 40, 119, 119 R, DIG. 3–4; 188/152, 153 R

[56] References Cited

U.S. PATENT DOCUMENTS

| | | | |
|---|---|---|---|
| 3,709,564 | 1/1973 | Jeffrey et al. | 303/16 |
| 3,716,274 | 2/1973 | Pier | 303/16 X |
| 3,876,262 | 4/1975 | Ferguson et al. | 303/13 X |
| 4,181,369 | 1/1980 | Balukin et al. | 303/16 |
| 4,509,801 | 4/1985 | Newton et al. | 303/25 X |
| 4,536,039 | 8/1985 | Barberis | 303/16 |
| 4,626,039 | 12/1986 | Worbois | 303/19 |
| 4,679,863 | 7/1987 | Ikeda et al. | 303/16 X |
| 4,744,607 | 5/1988 | Nagata | 303/16 |
| 4,830,437 | 5/1989 | Rumsey | 303/15 X |
| 4,904,027 | 2/1990 | Skantar et al. | 303/15 |

*Primary Examiner*—Douglas C. Butler
*Attorney, Agent, or Firm*—J. B. Sotak

[57] ABSTRACT

An electropneumatic locomotive brake system including an emulation routine for electronically simulating the functional operations of a relay air valve and for producing electrical output signals, an application electromagnetic and a release electromagnet receiving the electrical output signals and pneumatically controlling a J-relay air valve, a source of compressed air connected to the J-relay air valve and the application electromagnet and an air brake cylinder connected to the J-relay air valve for establishing the level of compressed air in the air brake cylinder in accordance with an automatic brake request and an independent brake request received from a brake command controller located in the cab of the locomotive.

13 Claims, 4 Drawing Sheets

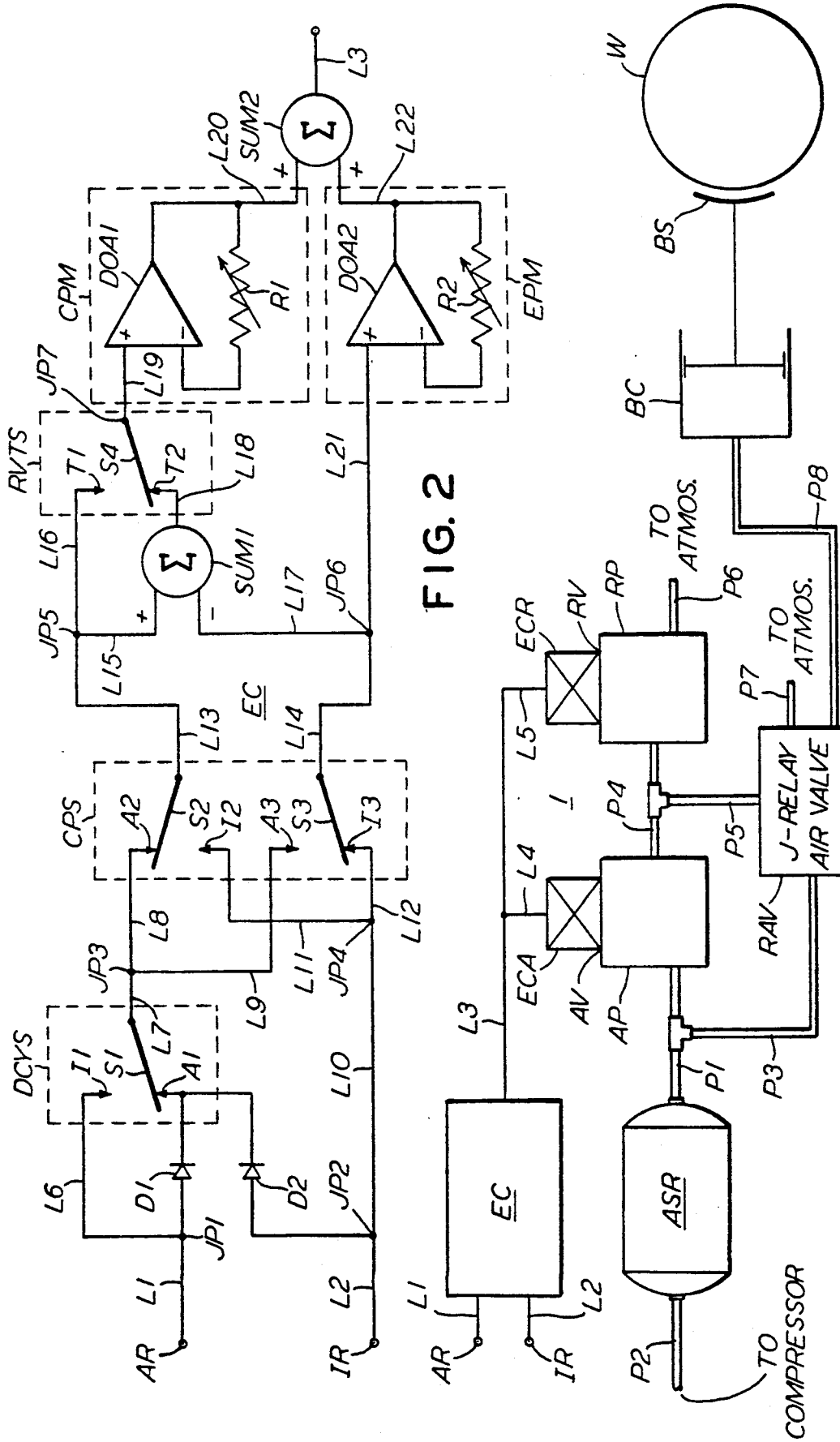

TABLE FOR SELECTING COMPILE TIME CONSTANTS
J-TYPE OF RELAY VALVE EMULATION ROUTINE

| ITEM | STATE | SELECTIVE FUNCTIONS |
|---|---|---|
| DOUBLE CHECK VALVE SELECTOR (DCVS) | ACTIVE-AI | MONITORS AUTOMATIC BRAKE CYLINDER REQUEST AND INDEPENDENT BRAKE CYLINDER REQUEST AND OUTPUTS THE GREATER OF THE TWO REQUESTS |
| | INACTIVE-II | MONITORS AUTOMATIC BRAKE CYLINDER REQUEST AND OUTPUTS AUTOMATIC BRAKE CYLINDER REQUEST |
| CONTROL PORT SELECTOR (CPS) | AUTOMATIC BRAKE CYLINDER REQUEST A2, I3 | AUTOMATIC BRAKE CYLINDER REQUEST APPLIED TO CONTROL PORT AND INDEPENDENT BRAKE CYLINDER REQUEST APPLIED TO EXHAUST PORT |
| | INDEPENDENT BRAKE CYLINDER REQUEST I2, A3 | INDEPENDENT BRAKE CYLINDER REQUEST APPLIED TO CONTROL PORT AND AUTOMATIC BRAKE CYLINDER REQUEST APPLIED TO EXHAUST PORT |
| RELAY VALVE TYPE SELECTOR (RVTS) | TYPE NO.1 T1 | MONITORS CONTROL PORT AND OUTPUTS CONTROL PORT |
| | TYPE NO.2 T2 | MONITORS CONTROL PORT AND EXHAUST PORT AND OUTPUTS CONTROL PORT MINUS(-) EXHAUST PORT |
| CONTROL PORT MULTIPLIER (CPM) | 0.00→2.00 | MONITORS CONTROL PORT AND OUTPUTS CONTROL PORT(X) A MULTIPLICATION FACTOR |
| EXHAUST PORT MULTIPLIER (EPM) | 0.00→2.00 | MONITORS EXHAUST PORT AND OUTPUTS EXHAUST PORT TIMES(X) A MULTIPLICATION FACTOR |

FIG. 3

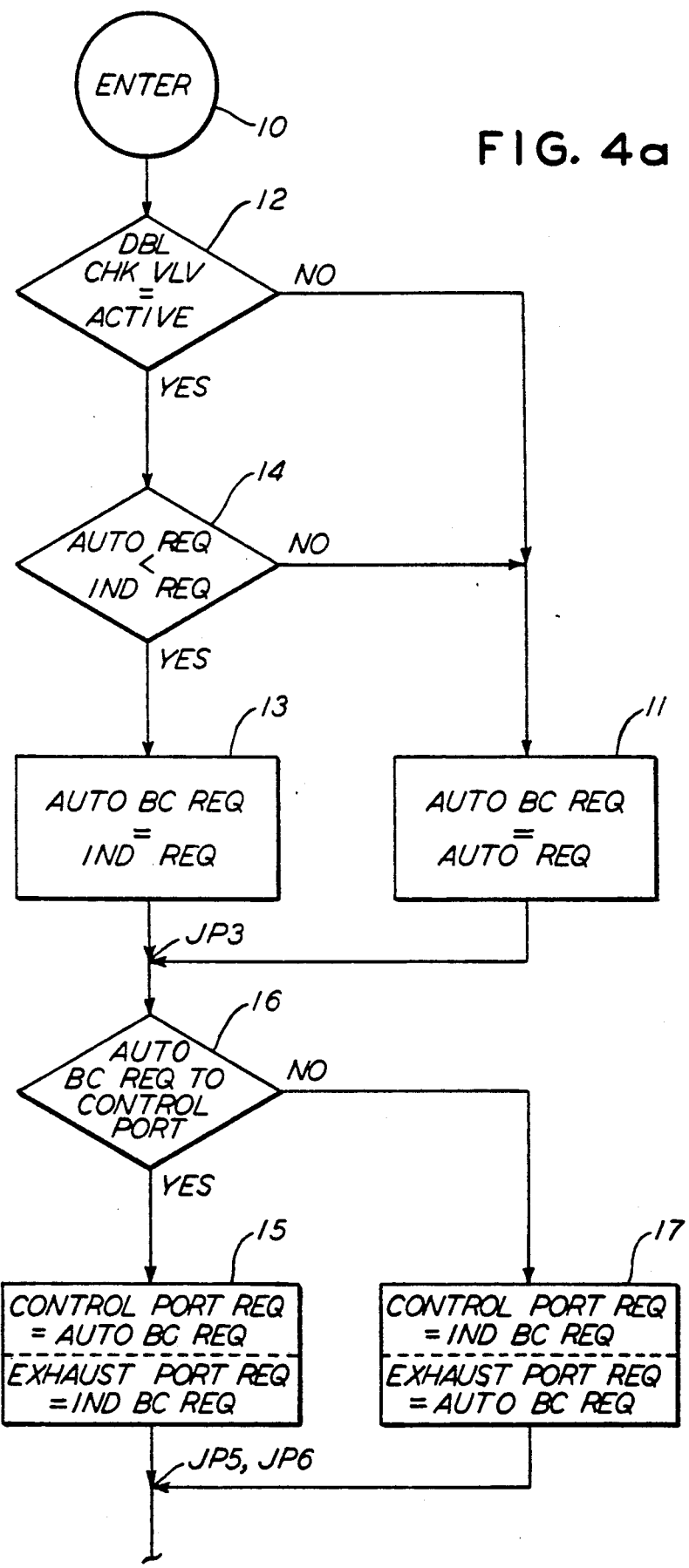

ARRANGEMENT FOR EMULATING A J-TYPE RELAY AIR VALVE USEABLE IN A RAILWAY BRAKING SYSTEM

FIELD OF THE INVENTION

This invention relates a method to emulate various types of J-relay air valves which are used in locomotive brake equipment and, more particularly, to a unique arrangement for emulating the different functions of a pneumatically operated J-relay air valve by electronically simulating its functional operation to effectively control the pneumatic pressure in the air brake cylinders from the cab of a railroad locomotive.

BACKGROUND OF THE INVENTION

It is conventional practice in existing railroad locomotive brake equipment to control and operate the braking system by varying the amount of air pressure within the brake cylinders. That is, the Westinghouse Air Brake Company locomotive air brake equipment is designed to effectively handle the present day train operations in which air, under pressure, is used for the braking of the locomotives as well as the trailing freight cars or passenger vehicles wherein the equipment on both freight and passenger locomotives is controlled in accordance with accepted application criteria. In the previous types of approved locomotive air brake equipments now in revenue service, the operation and control required to apply and release air from the brake cylinders is currently achieved by pneumatic devices. These previous devices include J-relay air valves, conduit or piping, double check valves, and various other peripheral pneumatic components. When the pneumatic components are combined and connected together, they will determine and control the braking characteristics provided by the locomotive. The required braking characteristic of a given locomotive is dependent upon its type and the manner in which it is used in service. In addition, the brake operating characteristics are determined by the type of relay air valve that is used and how it functions and is configured within the pneumatic system. It will be appreciated that the type of relay air valve installed in the system greatly contributes to the given operating characteristics so that a change will normally require that the entire pneumatic system be redesigned or reconstructed when the original J-relay air valve is replaced by a different type of J-relay air valve. That is, the removal and replacement of the initial type of J-relay air valve not only results in a vast change in the piping, but also normally requires the use of different peripheral components. This dramatic renovation in piping and components is due to the difference in construction between the various types of J-relay air valves. It will be appreciated that it would be highly advantageous and very economical to devise an alternate or substitute electronic control arrangement to attain the braking characteristics of a given railroad locomotive in order to avoid extensive reworking of piping and replacement of components that are now common with a J-relay air valve changeout.

OBJECTS AND SUMMARY OF THE INVENTION

Accordingly, it is an object of this invention to provide a unique electronic emulator for simulating the operating functions of a J-type of relay air valve.

Another object of this invention is to provide a novel circuit arrangement for emulating the functional operations of different types of J-relay air valves.

A further object of this invention is to provide a new electronic emulating circuit for simulating the functions of a relay air valve in response to automatic brake cylinder command requests and independent brake cylinder command requests for a railway locomotive.

Yet another object of this invention is to provide an improved method of emulating a J-relay air valve for obtaining the desired braking characteristics of a railroad locomotive.

Yet a further object of this invention is to provide an electropneumatic locomotive braking system comprising, means for electronically emulating the particular functions of a selected relay air valve and for producing electrical output signals, a pair of charging and discharging electromagnets receiving the electrical output signals and pneumatically controlling a J-relay air valve, a source of air pressure connected to the J-relay air valve and the changing electromagnet, and an air brake cylinder connected to the J-relay air valve for establishing the level of air pressure in the air brake cylinder in accordance with an automatic brake request and an independent brake request received from the cab of the locomotive.

Still another object of this invention is to provide an emulator for simulating the functions of a J-type relay air valve for use in an electropneumatic brake control system for railway vehicles comprising, an automatic brake cylinder command signal and an independent brake cylinder command signal conveyed to the input of a double check valve selection means which when active monitors the automatic brake cylinder command signal and the independent brake cylinder command signal and produces an output which is the greater of the two signals and which when inactive monitors the automatic brake cylinder command signal and produces an output corresponding to the automatic brake cylinder command signal, a control port selection means receiving the output from the double check valve selection means and receiving the independent brake cylinder command signal, the control port selection means having an automatic brake cylinder state in which the automatic brake cylinder command signal is conveyed to a control port and the independent brake cylinder command signal is conveyed to an exhaust port and having an independent brake cylinder state in which the independent brake cylinder command signal is conveyed to the control port and the automatic brake cylinder command signal is conveyed to the exhaust port, a relay valve type selection means for monitoring the brake cylinder command signal on the control port and for outputting the brake cylinder command signal when one type of J-relay air valve is being emulated and for monitoring the brake cylinder command signal on the control port and the brake cylinder command signal on the exhaust port and for outputting the braking cylinder command signal on the control port minus the brake cylinder command signal on the exhaust port when another type of J-relay air valve is being emulated, a control port multiplier circuit for monitoring the brake cylinder command signal on the control port and for producing an output which is a multiple of the brake cylinder command signal on the control port, an exhaust port multiplier circuit for monitoring the brake cylinder command signal on the exhaust port and for producing an output which is a multiple of the brake cylinder command signal on the exhaust port, and means for summing the multiple of the brake cylinder command signal on the control port and the multiple of the brake cylinder command signal on the exhaust port and for producing a simulated brake cylinder request.

Still a further object of this invention is to provide an electronic emulating logic circuit which is effective in operation, reliable in service, simple to retrofit, and economical in use, which results in the desired braking characteristics in a railroad locomotive.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1 is a diagrammatic illustration of an electropneumatic brake control system incorporating the features of the present invention.

FIG. 2 is a schematic circuit diagram of a type of electronically controlled logic circuit of a J-relay air valve emulation routine for use in FIG. 1.

FIG. 3 is a table depicting the compile time constants which is used on the software control of the J-relay valve emulation routine.

FIGS. 4a and 4b form a flow chart illustrating the software controlled J-relay valve emulation routine of the present invention.

DETAILED DESCRIPTION OF THE INVENTION

Figure 4B:
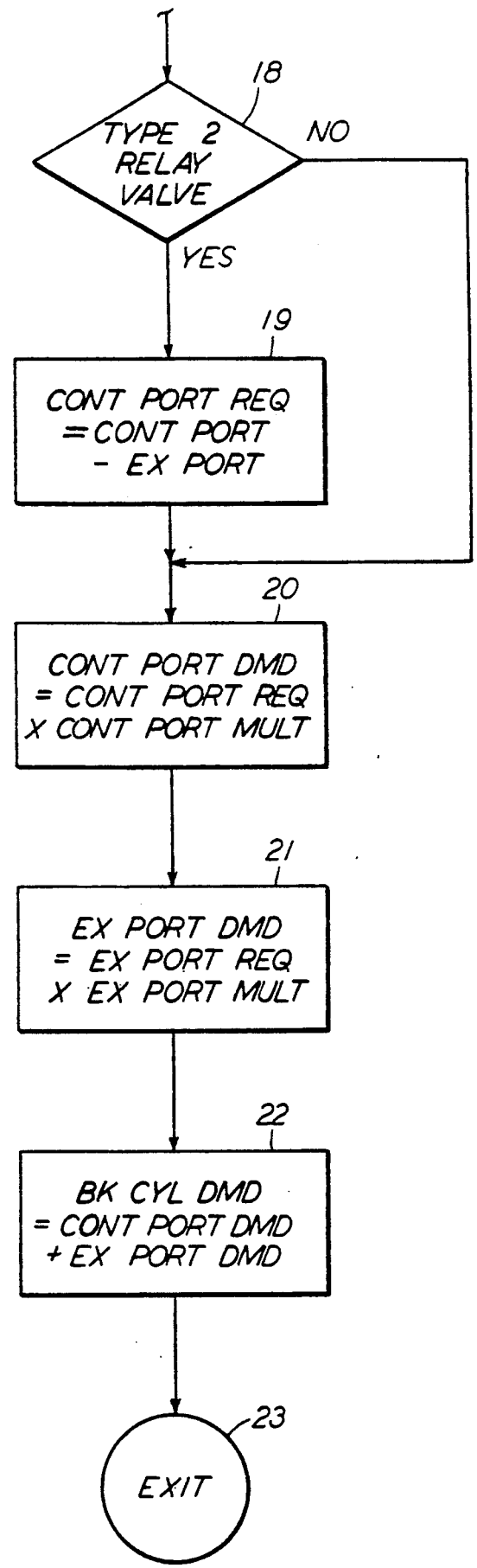

Referring now to the drawings, and in particular to FIG. 1, there is shown a portion of the air brake control system for a railway vehicle or locomotive, generally characterized by numeral 1. In a railroad and mass and-/or rapid transit operation, the engineer or train operator normally controls the braking from the cab of the lead locomotive. In practice, the cab includes a control station having a brake command controller which has a pair of manually rotatable levers or movable brake handles located within convenient reach of the train operator or engineer. A first automatic brake handle or lever is used for controlling the brakes of the entire consist of the train while a second independent brake handle or lever is used for controlling the brake cylinder pressure on the locomotive. The handles are separately and manually rotated to one of a plurality of selected positions to initiate the desired degree of braking or brake demand request. Each of the brake handles is mechanically coupled to the rotary shafts of an absolute position encoder which converts the handle position into an electrical signal. Thus, the electrical control signal designating the brake demand value for the given automatic brake request is conveyed to the input terminal AR while the electrical control signal designating the brake demand valve for the given independent brake request is conveyed to the input terminal IR. As shown, the command signals on the input terminals, namely, the automatic request and the independent request AR and IR are connected by leads L1 and L2, respectively, to the inputs of an emulation routine or logic circuit EC. That is, the emulator EC receives the automatic and independent brake commands and processes the received commands in accordance with the compiled time constants which have been selected, as will be described hereinafter. As shown, an output lead L3 is connected to the electrical coils ECA and ECR of electromagnetic application and release valves EV and RV by leads L4 and L5, respectively. The valves EV and RV are spring-biased, three-way multipurpose devices which provide the required electropneumatic interface. These directional control valves are designed so that an inlet port is connected to one outlet port when the coil is deenergized and is connected to a second outlet port when the coil is energized. These multipurpose valves are available as three-way normally open, normally closed, or directional control devices which are made and sold by Skinner Valve Division of Honeywell, Inc. The pneumatic inlet of portion AP of application or charging valve AV is connected to the outlet of an air supply reservoir ASR via piping P1 while the inlet of reservoir ASR is connected to a suitable source of pressure, such as, an air compressor (not shown) via pipe or conduit P2. The outlet of the reservoir ASR is also connected to the supply port of a J-1 relay air valve RAV via pipe or conduit P3. As shown, the pneumatic outlet of valve AV is connected to the pneumatic inlet of portion RP of the release or discharge valve RV via piping P4 and also is connected to the control port of the relay air valve RAV via pipe or conduit P5. The pneumatic outlet of portion RP of valve RV is exhausted to atmosphere via pipe or conduit P6. The relay air valve RAV is exhausted to atmosphere via pipe or conduit P7 and is connected by delivery pipe P8 to the brake cylinder BC that controls the movement of the brake shoes BS relative to the wheels W of the railway vehicles. Thus, the application of the brakes occurs when the brake cylinder BC is pressurized, and the release of the brakes takes place when the pressure in the cylinder is exhausted.

Let us now assume that we wish to simulate a J-1.6-16 relay air valve which is a double diaphragm operated self-lapping valve for directing air into or exhausting air from the brake cylinder delivery pipe during the operation of the air brakes at sixty percent (60%) of the piloting control pressure directed to port 16 plus one hundred percent (100%) of the piloting control pressure directed into port EX.

Referring now to FIG. 2, it will be seen that the functional operation of J-1.6-16 relay air valve software emulation routine is simulated by the schematic circuit diagram which is generally characterized by designation EC and electronically represents the content of the block EC of FIG. 1. As shown, the automatic brake cylinder request terminal AR is connected to junction point JP1 by lead L1 while the independent brake cylinder request terminal IR is connected to junction point JP1 by lead L2. The junction point JP2 is directly connected by lead L6 to an inactive contact point I1 of a single two-position switch S1 which is representative of the double check valve selector DCVS for emulating the appropriate relay air valve. The junction point JP1 is also connected by diode DL to an active contact point A1 of the two-position switch S1. In order to emulate a J-1.6-16 relay air valve, a movable heel contact of switch S1 is selected to be in contact with the active contact point A1.

It will be seen that the junction point JP2 is also connected by diode D2 to the active contact point A1. As shown, the movable heel contact of switch S1 is connected to junction point JP3 by lead L7. The junction point JP3 is directly connected by leads L8 and L9 to the automatic contact points A2 and A3, respectively, of a pair of two-position switches S2 and S3 which simulate the control port selector CPS of the J-1.6-16 relay air valve. As shown, the junction point JP2 is connected to junction point JP4 by lead L10. The junction point JP4 is directly connected to the independent contact points I2 and I3 of switches S2 and S3 via leads L11 and L12, respectively. In emulating the J-1.6-16 relay air valve, the movable heel contact of switch S2 is selected to be in contact with the automatic contact point A2 while the movable heel contact of switch S3 is selected to be in contact with the independent contact point I3. The movable heel contact of switch S2 is connected by lead L13 to junction point JP5 while the movable heel contact of switch S3 is connected to junction point JP6 by lead L14. It will be seen that junction point JP5 is connected by lead L15 to the positive (+) input of a first summing network SUM1 and is connected to a contact point T1 of a two-position switch S4 which is representative of the relay valve type selector RVTS. As shown, the junction point JP6 is connected to the negative (−) input of the first summing network SUM1 by a lead L17. The output of the first summing network SUM1 is connected by lead L18 to the contact point T2 of the two-position switch S4. It will be seen that the movable heel contact of switch S4 is selected to be in contact with contact point T2 a relay valve type selector RVTS of the J-1.6-16 relay air valve. The movable heel contact of switch S4 is selected to be connected by lead L19 to the positive (+) input of a differential operational amplifier DOA1 which functions as a control port multiplier CPM1 to produce an output signal which is sixty percent (60%) of the simulated piloting control pressure signal. It will be seen that a feedback path is connected from the output of the amplifier DOA1 to the negative (−) input via a variable resistor R1. The 60% output is connected to a first positive (+) input of a second summing network SUM2 via lead L20.

As shown, the junction point JP6 which represents the exhaust control pressure signal is connected by lead L21 to the positive (+) of a second differential operational amplifier DOA1. The amplifier DOA1 functions as the exhaust control port multiplier CPMS to produce an output which is one hundred percent (100%) of the simulated exhaust control pressure signal. It will be seen that a feedback path is connected from the output of the amplifier DOA2 to the negative (−) input via a variable resistor R2. The 100% output is connected to a second positive (+) input of the second summing network SUM2 via lead L22. Thus, the output signal appearing on lead L3 of the second summing network SUM2 will be 160% of the simulated control pressure demand request.

Referring now to FIG. 3, there is shown a table of the listing of the various selections which will permit the software to be programmed to emulate the J-relay air valve in the configuration of FIGS. 1 and 2. In practice, all of the logic and configuration parameters which were previously "piped" into the pneumatic brake control system are implemented within the software. Various modifications to the to the brake control system can be performed by selecting the appropriate compile time constants illustrated in the reference table of FIG. 3, and then burning them into an erasable programmable read-only memory, such as, a 27C256 EPROM device which is manufactured and sold by National Semiconductor or Texas Instruments. Thus, the selected compile time constants permit the electronic simulation of various types of J-relay air valves so that desired brake characteristics may be varied by simply changing the given EPROM device without modifying the pneumatic hardware. As shown in FIG. 3, the first listed item is the double check valve selector DCVS which has an active state A1 and an inactive state I1. The active state monitors both the automatic brake cylinder request and the independent brake cylinder request and outputs the brake cylinder request that is the greatest. In its inactive state I1, the double check valve selector DCVS only monitors and outputs the automatic brake cylinder request. The second listed item is the control port selector CPS which has an automatic brake cylinder request state A2, I3 and an independent brake cylinder request state I2, A3. In the state A2, I3, the automatic brake cylinder request is applied to the control port and the independent brake cylinder request is applied to the exhaust port. In the state I2, A3, the independent brake cylinder request is applied to the control port and the automatic brake cylinder request is applied to the exhaust port. The third listed item is the relay valve selector RVTS which may represent one of two types of valves. The No. 1 type T1 only monitors and outputs the control port while the No. 2 type T2 monitors both the control port and the exhaust port and outputs the control port minus the exhaust port. The fourth listed item is the control port multiplier CPM and the fifth listed item is the exhaust port multiplier EPM. The multipliers have a multiplication factor from 0.00 to 2.00. The multiplier CPM monitors the control port and outputs the control port times a factor while the multiplier EPM monitors the exhaust port and outputs the exhaust port times a multiplication factor. In the emulation of the J-1.6-16 relay air valve, the control port multiplication factor is 0.60 while the exhaust port multiplication factor is 1.00 so that output signal developed on lead L3 is 160% of the input control signal.

Turning now to the flow chart of FIGS. 4a and 4b, it will be seen that a sequence of operations is initiated by a start signal emanating from the ENTER block 10. As shown in FIG. 4a, the start signal is fed to the decision block 12 which outputs a "YES" if double check valve is active and outputs a "NO" if the double check valve is inactive. The "YES" output is fed to the decision block 14 while the "NO" output is fed to block 11. The decision block 14 outputs a "YES" if the automatic brake cylinder request is less than the independent request and outputs a "NO" if the automatic request is not less than the independent request. The "YES" output is fed to block 13 which establishes that the automatic brake cylinder request is equal to the independent request and the "NO" output is fed to block 11 which establishes that the automatic brake cylinder request is equal to the automatic request. If the decision block 16 outputs a "YES" the control port is equal to the automatic brake cylinder request and the exhaust port is equal to the independent brake cylinder request as shown by block 15 and if the decision block 16 outputs a "NO" the control port is equal to the independent brake cylinder request and the exhaust port is equal to the automatic brake cylinder request as shown by block 17. The outputs of blocks 15 and 17 are fed to junction point JP5, JP6 which is connected to decision block 18 as shown in FIG. 4b. The decision block 18 determines type of relay air valve. If the relay is type No. 2, a "YES" output is fed to block 19 which establishes that the control port request is equal control request minus the exhaust request, and a "NO" output is connected junction point JP7 which connotes that the control port request is equal to the control port request. The junction point JP7 is connected to block 20 which resolves that the control port demand is equal to the control port request times a control port multiplier. The next block 21 determines that the exhaust port demand is equal to the exhaust port request times an exhaust port multiplier. Finally, the brake cylinder demand is calculated as the sum of the control port demand and the exhaust port demand which is the output of block 22. This output is fed to EXIT block 23 which terminates the present brake cylinder command request and the system is ready to process a subsequent brake cylinder command request.

Thus, the present invention has been described in such full, clear, concise and exact terms as to enable any person skilled in the art to which it pertains to make and use the same, and having set forth the best mode contemplated of carrying out my invention. Further, I state that the subject matter which I regard as being my invention is particularly pointed out and distinctly set forth in what is disclosed and claimed.

It will be understood that various alterations and changes may be made by those skilled in the art without departing from the spirit and scope of the subject invention. Further, with the advent of microprocessors and minicomputers, it is evident that the various functions and operations may be effectively carried out and processed by a suitably programmed computer or EPROM device which is programmed to other compile time constants to process various inputs and produces the appropriate outputs. Therefore, it will be appreciated that certain modifications, ramifications, and equivalents will be readily apparent to persons skilled in the art and, accordingly, it is understood that the present invention should not be limited to the exact embodiment shown and described, but should be accorded the full scope and protection of the appended claims.

I claim:

1. An electropneumatic locomotive braking system comprising, means for electronically emulating operating functions of a relay air valve and for producing electrical output signals, a pair of charging and discharging electromagnet receiving the electrical output signals from said electronic emulating means and pneumatically controlling said relay air valve, a source of air pressure connected to said relay air valve and said charging electromagnet, and an air brake cylinder connected to said relay air valve for establishing a level of air pressure in said air brake cylinder in accordance with an automatic brake cylinder request and an independent brake cylinder request.

2. The electropneumatic locomotive braking system as defined in claim 1, wherein said electronic emulating means includes a microprocessor which is programmed to simulate said relay air valve.

3. The electropneumatic locomotive braking system as defined in claim 2, wherein said microprocessor is an EPROM which is burned-in to simulate said relay air valve.

4. The electropneumatic locomotive braking system as defined in claim 1, wherein said electronic emulating means is conditioned by an active double check valve selection for monitoring the automatic brake cylinder request and the independent brake cylinder request and for outputting the greater of the two requests.

5. The electropneumatic locomotive braking system as defined in claim 1, wherein said electronic emulating means is conditioned by an inactive double check valve selection for monitoring the automatic brake cylinder request and for outputting the automatic brake cylinder request.

6. The electropneumatic locomotive braking system as defined in claim 1, wherein said electronic emulating means includes a control port selection means for conveying the automatic brake cylinder request to a simulated control port and for conveying the independent brake cylinder request to a simulated exhaust port.

7. The electropneumatic locomotive braking system as defined in claim 6, wherein said control port selection means for alternately conveying the automatic brake cylinder request to the simulated exhaust port and alternately conveying the independent brake cylinder request to the simulated control port.

8. The electropneumatic locomotive braking system as defined in claim 6, wherein said electronic emulating means includes a relay valve type selection means which monitors the simulated control port and outputs the automatic brake cylinder request.

9. The electron pneumatic locomotive braking system as defined in claim 8, wherein the relay valve type selection means monitors the simulated control port and the simulated exhaust port and outputs the automatic brake cylinder request minus the automatic brake cylinder request.

10. The electropneumatic locomotive braking system as defined in claim 8, wherein said electronic emulating means includes a control port multiplier means which monitors the simulated control port and outputs the automatic brake cylinder request times a multiplying factor.

11. The electropneumatic locomotive braking system as defined in claim 10, wherein said electronic emulating means includes an exhaust port multiplier means which monitors the simulated exhaust port and outputs the independent brake cylinder request times a multiplying factor.

12. The electropneumatic locomotive braking system as defined in claim 11, wherein the automatic brake cylinder request times the multiplying factor and the independent brake cylinder request times the multiplying factor are added together to form the electrical output signals.

13. An emulator for simulating operating functions of a relay air valve for use in a electropneumatic brake control system for railway vehicles comprising, an automatic brake cylinder command signal and an independent brake cylinder command signal conveyed to an input of a double check valve selection means which when active monitors the automatic brake cylinder command signal and the independent brake cylinder command signal and produces an output which is the greater of the two signals and which when inactive monitors the automatic brake cylinder command signal and produces an output corresponding to the automatic brake cylinder command signal, a control port selection means receiving the output from the double check valve selection means and receiving the independent brake cylinder command signal, the control port selection means having an automatic brake cylinder state in which the automatic brake cylinder command signal is conveyed to a control port and the independent brake cylinder command signal is conveyed to an exhaust port and having an independent brake cylinder state in which the independent brake cylinder command signal is conveyed to the control port and the automatic brake cylinder command signal is conveyed to the exhaust port, a relay valve type selection means for monitoring a brake cylinder command signal on the control port and for outputting the brake cylinder command signal on the control port for emulating one type of air valve and for monitoring the brake cylinder command signal on the control port and the brake cylinder command signal on the exhaust port and for outputting the braking cylinder command signal on the control port minus the brake cylinder command signal on the exhaust port for emulating another type of relay air valve, a control port multiplier circuit for monitoring the brake cylinder command signal on the control port and for producing an output which is a multiple of the brake cylinder command signal on the control port, an exhaust port multiplier circuit for monitoring the brake cylinder command signal on the exhaust port and for producing an output which is a multiple of the brake cylinder command signal on the exhaust port, and means for summing the multiple of the brake cylinder command signal on the control port and the multiple of the brake cylinder command signal on the exhaust port and for producing a simulated brake cylinder request.

* * * * *

UNITED STATES PATENT AND TRADEMARK OFFICE
CERTIFICATE OF CORRECTION

PATENT NO. : 5,104,203
DATED     : April 14, 1992
INVENTOR(S) : Vincent Ferri

It is certified that error appears in the above-identified patent and that said Letters Patent is hereby corrected as shown below:

Column 8, line 20, delete "electron pneumatic"

and insert --electropneumatic--

Column 9, line 3, after "emulating one type of"

insert --relay--

Signed and Sealed this

Sixth Day of July, 1993

Attest:

MICHAEL K. KIRK

*Attesting Officer*   Acting Commissioner of Patents and Trademarks